No. 869,563. PATENTED OCT. 29, 1907.
J. F. HARDY.
HANDPIECE FOR DENTAL ENGINES.
APPLICATION FILED NOV. 24, 1906.
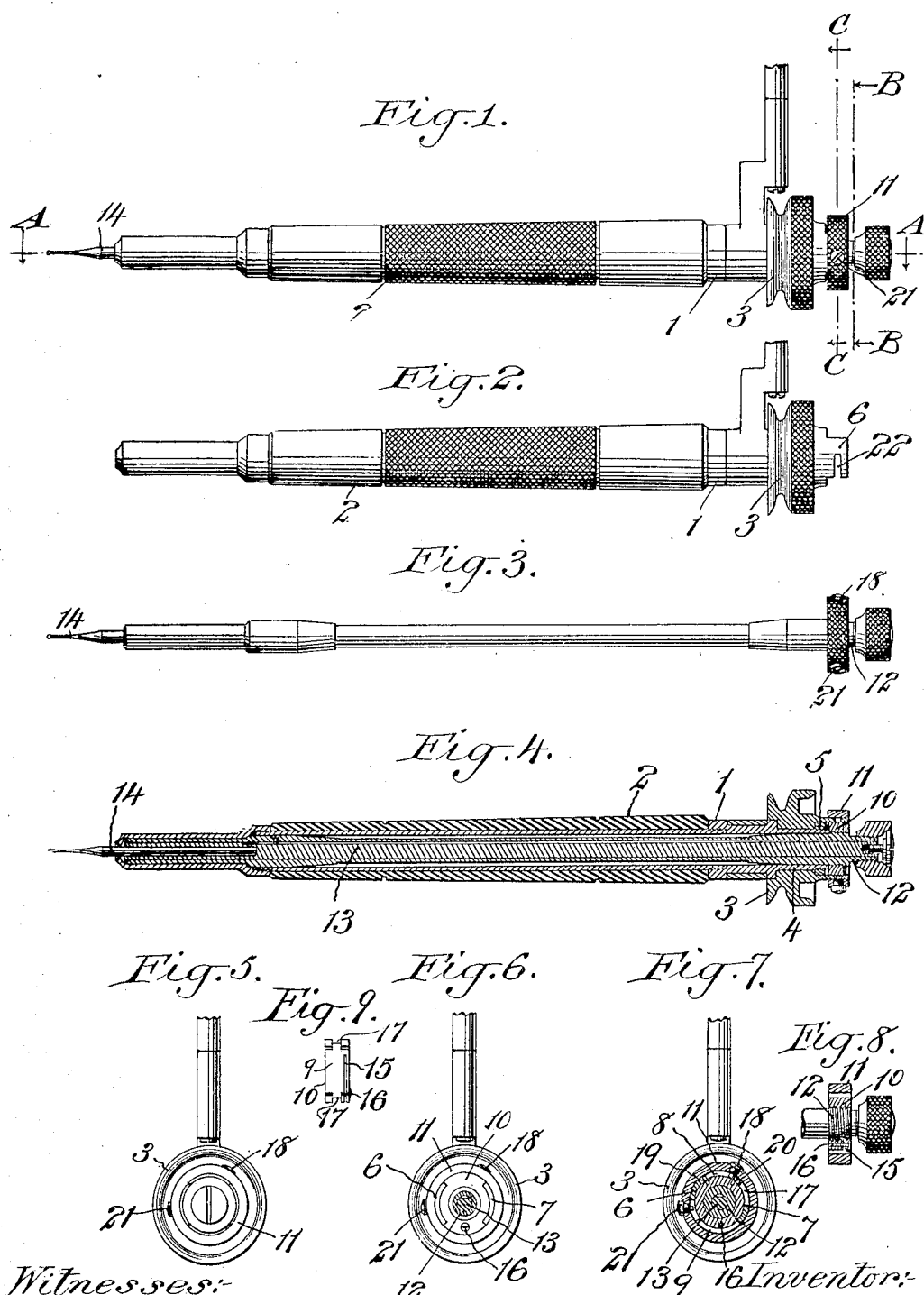
Witnesses:
F. George Barry,
Henry Thieme.
Inventor:
James F. Hardy
by attorneys

UNITED STATES PATENT OFFICE.

JAMES F. HARDY, OF NEW YORK, N. Y., ASSIGNOR TO CONSOLIDATED DENTAL MANUFACTURING COMPANY, OF NEW YORK, N. Y., A CORPORATION OF NEW YORK.

HANDPIECE FOR DENTAL ENGINES.

No. 869,563.     Specification of Letters Patent.     Patented Oct. 29, 1907.

Application filed November 24, 1906. Serial No. 344,945.

*To all whom it may concern:*

Be it known that I, JAMES F. HARDY, a citizen of the United States, and a resident of the borough of Manhattan, in the city and State of New York, have invented a new and useful Handpiece for Dental Engines, of which the following is a specification.

My invention relates to a hand piece for dental engines, with the object in view of providing simple and expeditious means for removing the tool and its chuck bodily from the rear end of the holder.

A practical embodiment of my invention is represented in the accompanying drawings, in which Figure 1 is a view of the hand piece in side elevation, Fig. 2 is a view of the holder in side elevation, Fig. 3 is a view of the spindle in side elevation, Fig. 4 is a longitudinal section in the plane of the line A—A of Fig. 1, Fig. 5 is an end view, Fig. 6 is a transverse section in the plane of the line B—B of Fig. 1, Fig. 7 is a transverse section in the plane of the line C—C of Fig. 1, Fig. 8 is a partial longitudinal section in detail through the nut and locking ring near the rear end of the spindle, and Fig. 9 is a view in detail of the nut.

The holder in which the spindle revolves is denoted by 1 and is shown as provided with a rubber hand rest 2 as is usual.

The pulley for rotating the spindle is denoted by 3 and is seated on a reduced part 4 of the holder and held in position by means of a nut 5. This pulley is provided with rearwardly projecting lips 6 and 7, arranged to enter two slots 8 and 9 formed between a nut 10 and a locking ring 11 made fast on the tubular spindle 12 near its rear end. The spindle 12 has seated within it the tool carrier 13, the tool 14 being locked in position by the sliding movement of the tool carrier 13 relative to the hollow spindle 12 as is usual, the two parts 12 and 13 being constructed to form at their forward end a chuck for clamping and releasing the tool.

The nut 10 which is screwed onto the spindle is provided with a split 15 by means of which the parts of the nut may be drawn together by a clamp screw 16 to lock the nut in position on the spindle. The nut 10 is provided with an annular groove 17 in its periphery, the walls of which are cut away to form the slots 8 and 9 where the lips 6 and 7 enter between the ring 11 and the nut 10.

The lips 6 and 7 hereinabove referred to are curved in the arc of a circle to correspond with the curve of the slots 8 and 9 between the nut 10 and the ring 11 and the ring 11 is fitted to the exterior of the nut with a close rotary fit and is permitted a limited rotary movement on the nut. The limits of this rocking movement are determined by means of a stop screw 18 projecting through the ring 11 into the groove 17 and pins 19 and 20 are set in and project upwardly from the bottom of the groove 17 on opposite sides of the screw 18 to form abutments or stops to limit the rotary motion of the ring. The screw 18 not only coacts with the stops 19 and 20 to limit the rotary movement of the ring on the nut but also by projecting into the annular groove 17 serves to lock the ring against endwise displacement on the nut. A second screw 21 is set in the ring 11 and projects inwardly through the ring in position to register with a slot 22 (see Fig. 2) formed in the lip 6 of the pulley.

The parts are so arranged that when the spindle with its tool holder is slid forwardly into position for use, the ring 11 may be rotated to bring the locking screw 21 into engagement with the walls of the slot 22 thereby locking the pulley to the spindle and at the same time locking the spindle and its tool holder against longitudinal displacement.

To remove the spindle, together with the tool holder and tool, from the hand piece casing, it is simply necessary to rotate the ring 11 a short distance, releasing the screw 21 from the slot 22 when the spindle, together with the nut 10 and ring 11 with the tool holder therein, may be bodily slid rearwardly out of the holder for the purpose of changing the tool or for any other purpose that may be desired.

To reassemble the parts requires simply sliding the spindle with its tool holder and tool therein forwardly through the rear end of the holder and giving the ring 11 a slight turn to lock the parts in position ready for use. This simple arrangement does away with the necessity of removing a screw and thereby materially expedites the time heretofore required for the removal and assembling of the parts.

What I claim is:—

1. In a dental hand piece, the combination with a holder, of a spindle and its tool carrier constructed to be moved through the rear end of the holder and means arranged to be operated by the hand of the operator for locking and releasing the spindle to and from the holder.

2. In a dental hand piece, the combination with a holder, of a spindle and its tool carrier constructed to be removed from the holder through the rear end of the holder and a rocking catch arranged to be operated by the hand of the operator for locking and releasing the parts.

3. In a dental hand piece, the combination with a holder, of a spindle and its tool carrier constructed to be removed through the rear end of the holder, a pulley mounted on the holder and provided with a rearwardly projecting lip and a rocking part on the spindle arranged to interlock with the said lip for locking and releasing the parts.

4. In a dental hand piece, the combination with a holder, and a spindle constructed to be removed through the rear end of the holder, of a pulley mounted on the holder and a part having a limited rotary movement on the spindle, the said pulley and the rotary part being provided the one with a tongue and the other with a part arranged to interlock with the tongue for locking and releasing the spindle to and from the pulley.

5. In a dental hand piece, the combination with a holder and a spindle constructed to be removed bodily through the rear end of the holder, a pulley mounted on the holder, a nut locked to the spindle and a ring arranged to be rotated on the nut, the said pulley and ring being provided, the one with a lip and the other with a part arranged to interlock with the lip for locking the spindle to and releasing it from the pulley.

6. In a dental hand piece, the combination with a holder, a pulley mounted on the holder and a spindle constructed to be removed through the rear end of the holder, of a split nut engaged with the spindle, a screw for locking the nut to the spindle and a ring seated on the nut and having a limited rotary movement thereon, the said pulley being provided with a slotted lip and the said ring being provided with a projection arranged to engage the slot in the lip for locking the spindle to and releasing it from the pulley.

7. In a dental hand piece, the combination with a holder, a pulley seated thereon, and provided with rearwardly projecting lips and a spindle constructed to be removed through the rear end of the holder, of a part secured to the spindle and provided with slots for the reception of the lips on the pulley and means for removably locking the spindle to the pulley.

8. In a dental hand piece, the combination with a holder, a pulley mounted on the holder and a spindle constructed to be removed through the rear end of the holder, of means carried by the spindle for locking the spindle to the pulley and a split nut engaged with the spindle and forming a support for the said locking means.

In testimony, that I claim the foregoing as my invention, I have signed my name in presence of two witnesses, this twenty-second day of November 1906.

JAMES F. HARDY.

Witnesses:
JAMES MURRAY,
H. D. BULTMAN.